UNITED STATES PATENT OFFICE.

FERDINAND SIERING, OF NEW YORK, N. Y.

IMPROVEMENT IN PROCESSES OF PREPARING FELT FOR WEATHER-STRIPS, PACKINGS, &c.

Specification forming part of Letters Patent No. 145,913, dated December 23, 1873; application filed July 1, 1873.

*To all whom it may concern:*

Be it known that I, FERDINAND SIERING, of the city, county, and State of New York, have invented a new and Improved Process for Treating Felt; and I do hereby declare the following to be a full, clear, and exact description thereof, which will enable those skilled in the art to make and use the same.

This invention relates to a certain process or mode of treating or preparing felt, in a manner substantially as hereinafter described, whereby the body of the same is enabled to retain sufficient elasticity, and thus afford a superior packing for weather-strips, piston-rods, and valve-rods in steam-engines, and for any other purpose where a packing may be required or found essential; and to this end the invention consists in, first, cutting the felt into strips or pieces of the desired size or shape and coating the same on one or more surfaces with starch, after which the surface is ground off and a protecting coating of suitable metallic paint applied thereto.

In carrying out my invention I take felt and cut it up in pieces suitable for the purposes for which the same are to be used. I then apply to those surfaces of the pieces of felt which will be exposed when they are applied as packing one or more coats of starch, and after the starch has dried I grind off the working surface or surfaces of the packing-pieces, and, finally, apply thereto one or more coats of white lead or other metallic paint.

By this treatment the body of the felt retains its elasticity, while the working-surface of each packing-piece is perfectly even and protected against friction by the metallic paint, and by the starch.

The packing-pieces, as above described, can be used with great advantage for packing in weather-strips, or in stuffing-boxes of valve-rods or piston-rods, and for other purposes of a similar nature.

What I claim as new, and desire to secure by Letters Patent, is—

The within-described process of treating felt by first cutting it in strips or pieces of the required shape, then coating these pieces on one or more surfaces with starch, then grinding off these surfaces, and applying a coat of metallic paint, substantially as set forth.

FERDINAND SIERING.

Witnesses:
W. HAUFF,
E. F. KASTENHUBER.